(12) United States Patent
Carr

(10) Patent No.: US 10,655,925 B2
(45) Date of Patent: May 19, 2020

(54) FIREARM SPRING COMPRESSION TOOL

(71) Applicant: Walter W. Carr, Harrisonburg, VA (US)

(72) Inventor: Walter W. Carr, Harrisonburg, VA (US)

( * ) Notice: Subject to any disclaimer, the term of this patent is extended or adjusted under 35 U.S.C. 154(b) by 0 days.

(21) Appl. No.: 16/223,487

(22) Filed: Dec. 18, 2018

(65) Prior Publication Data

US 2019/0186855 A1 Jun. 20, 2019

Related U.S. Application Data

(60) Provisional application No. 62/607,164, filed on Dec. 18, 2017.

(51) Int. Cl.
| | |
|---|---|
| *F41A 11/02* | (2006.01) |
| *F41C 23/16* | (2006.01) |
| *F41A 35/00* | (2006.01) |
| *F41A 11/00* | (2006.01) |
| *B23P 19/04* | (2006.01) |

(52) U.S. Cl.
CPC ............. *F41A 11/02* (2013.01); *B23P 19/04* (2013.01); *F41A 11/00* (2013.01); *F41A 35/00* (2013.01); *F41C 23/16* (2013.01)

(58) Field of Classification Search
CPC .......... F41A 11/00; F41A 11/02; F41A 35/00; F41C 23/16
See application file for complete search history.

(56) References Cited

U.S. PATENT DOCUMENTS

| | | | |
|---|---|---|---|
| 6,269,577 B1 * | 8/2001 | Hardy | F41A 35/00 42/127 |
| 7,444,775 B1 | 11/2008 | Schuetz | |
| 8,572,884 B1 * | 11/2013 | Saur | F41A 11/00 269/909 |

OTHER PUBLICATIONS

"Brownells—AR-15 Handguard Removal Tool", https://www.youtube.com/watch?v=5aULvwJsJeo (Year: 2008).*
"AR-15 Schematic—Exploded Gun Diagrams, Gun Parts".

* cited by examiner

*Primary Examiner* — Joshua T Semick
(74) *Attorney, Agent, or Firm* — Law Office of Mark Brown, LLC; Mark E. Brown

(57) ABSTRACT

A firearm spring compression tool includes a base configured for anchoring the tool in a magazine well. A yoke is mounted on the base and includes a pair of arms configured for capturing a delta ring ("D-ring") or other component on a firearm. An actuator is rotatably mounted on the yoke and is rotatable between a first, placement position for placing the yoke over the uncompressed D-ring and a second, compressed, release position. With the actuator in its second position, the D-ring is compressed whereby a handguard component of the firearm is released for removal in connection with a firearm servicing procedure.

20 Claims, 16 Drawing Sheets

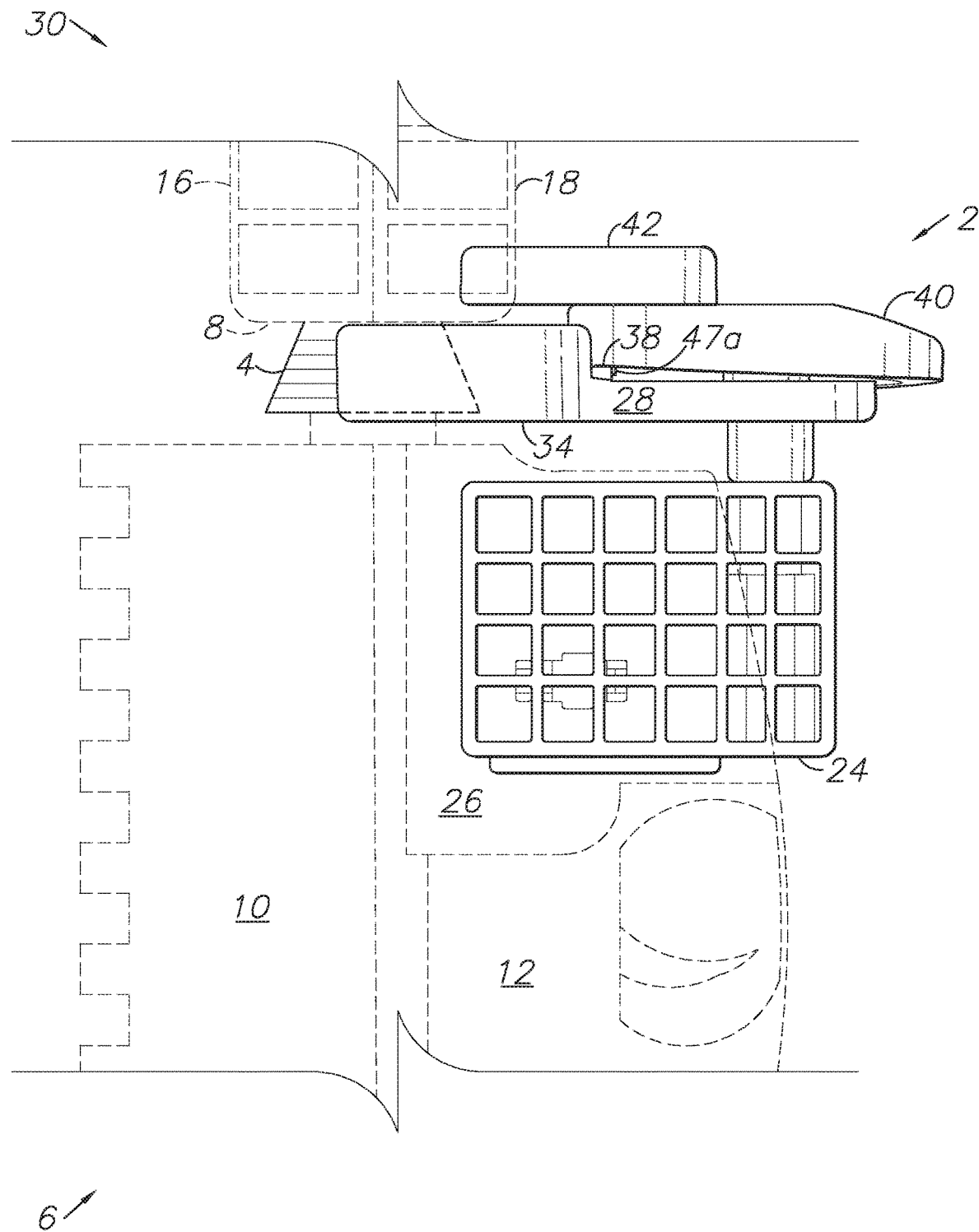
FIG. 5.1

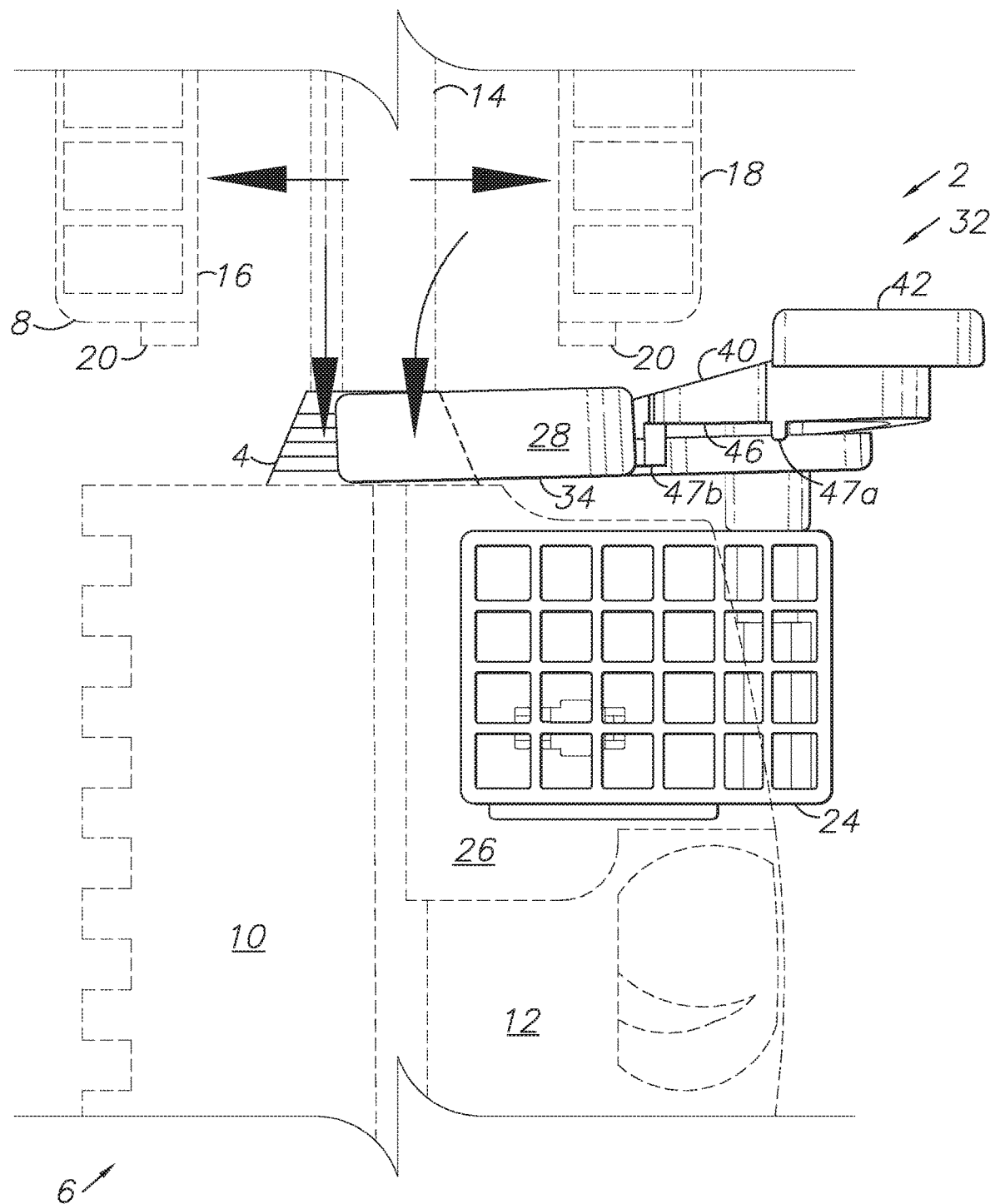
FIG. 5.2

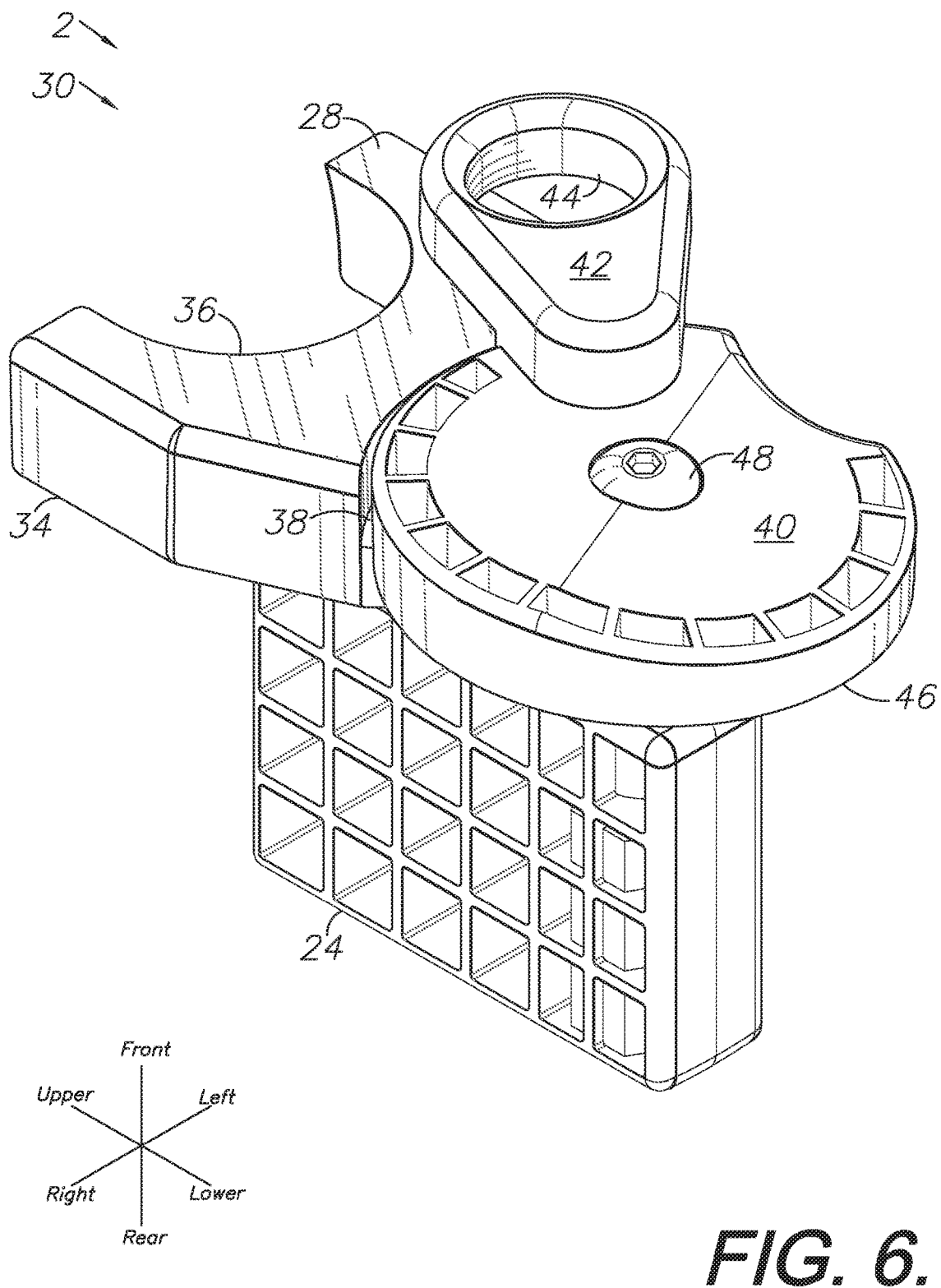
FIG. 6.1

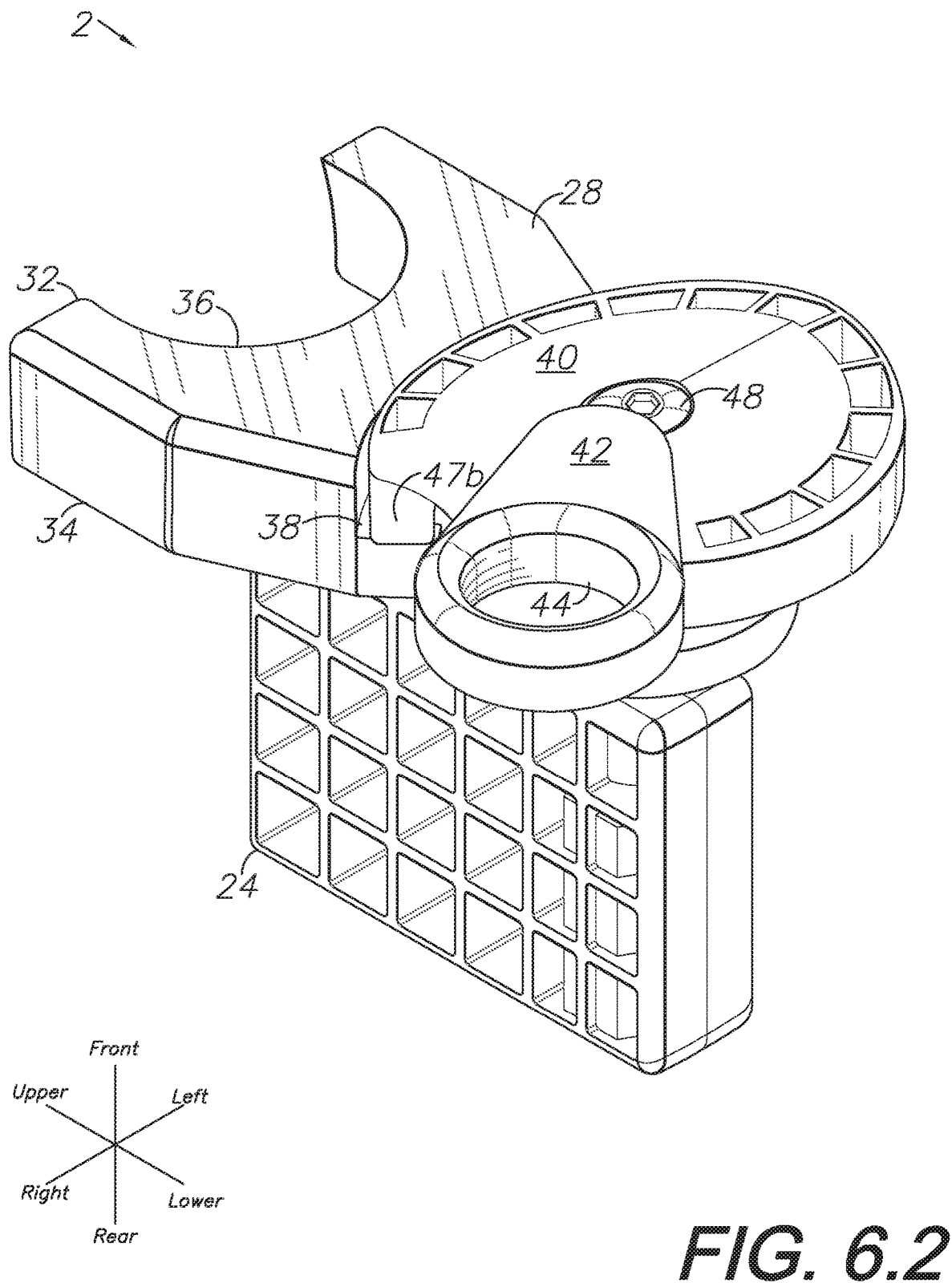
FIG. 6.2

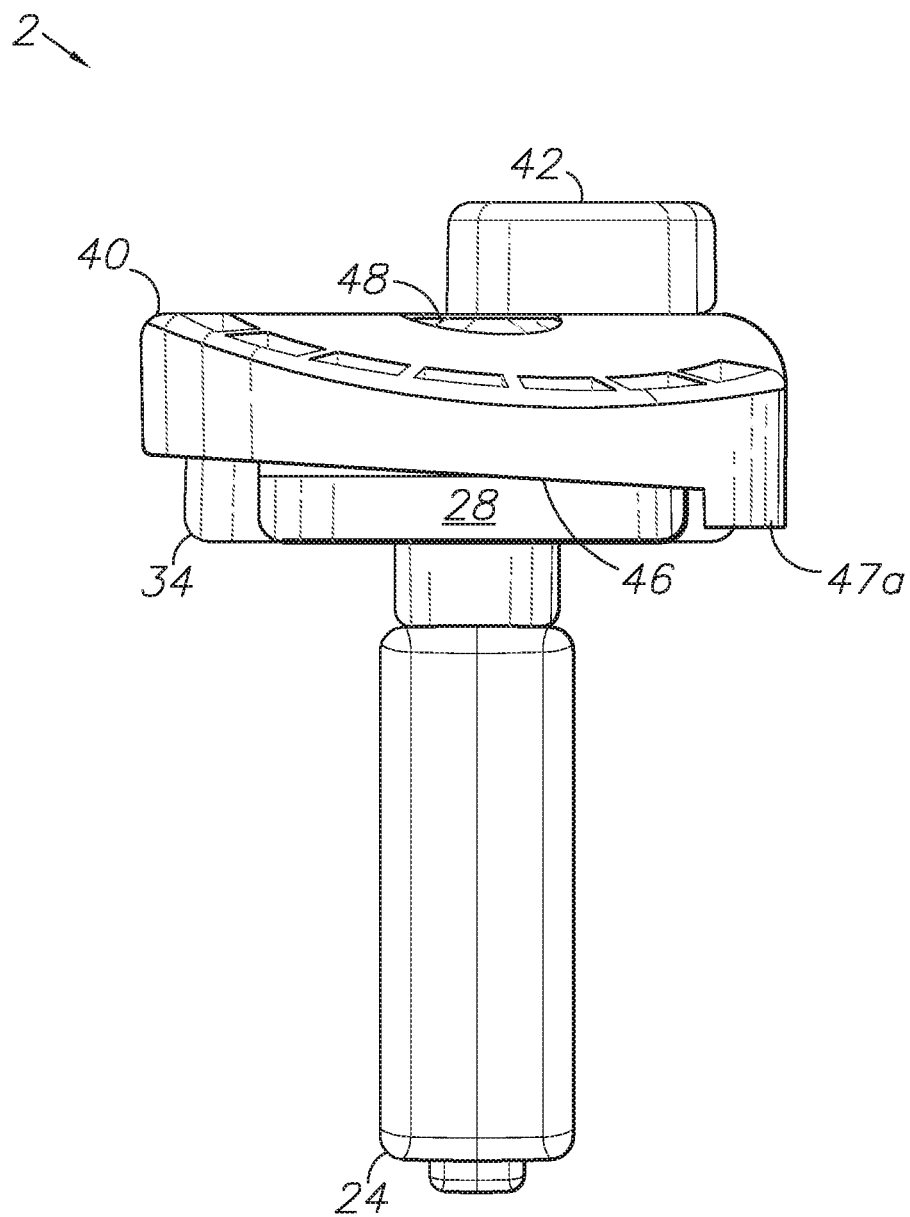
FIG. 7.1

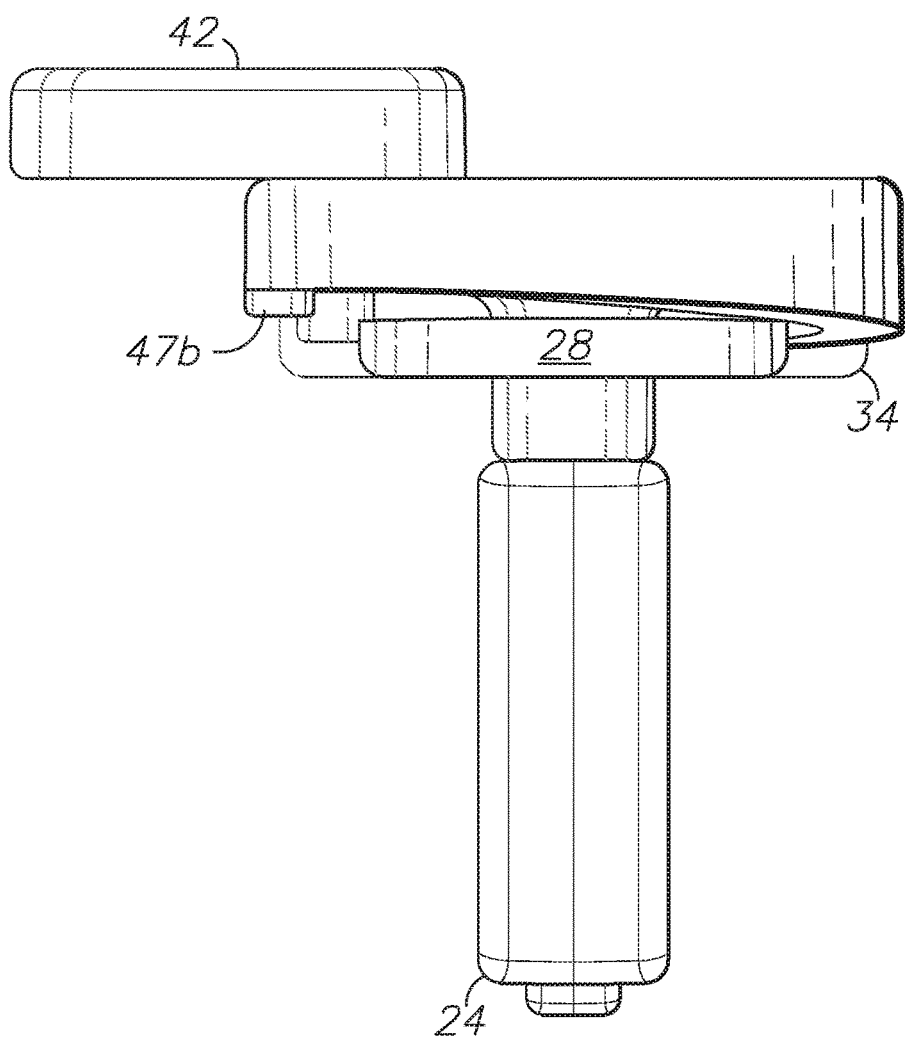
FIG. 7.2

FIREARM SPRING COMPRESSION TOOL

CROSS-REFERENCE TO RELATED APPLICATION

This application claims priority in U.S. Provisional Patent Application No. 62/607,164, filed Dec. 18, 2017, which is incorporated herein by reference.

BACKGROUND OF THE INVENTION

1. Field of the Invention

The present invention relates generally to firearm servicing, and in particular to a tool for compressing springs for firearm assembly and disassembly procedures.

2. Description of the Related Art

Firearm servicing procedures typically require disassembly and reassembly of various parts. For example, AR-15 (civilian model) and M-4 and M-16 (military models) rifles and carbines commonly include handguards enclosing their barrels and gas tubes. The handguards are configured for gripping by shooters, and are longitudinally split into separate (e.g., upper and lower) handguard halves. With the AR-15, M-4 or M-16 rifles assembled, the handguard halves are clamped together at their rear ends by compressible delta rings ("D-rings"). The handguard disassembly procedure includes compressing the D-ring to release the rear ends, and extracting the front ends of the handguard halves from a handguard front cap connected to the barrel.

Specialized tools have previously been developed for compressing D-rings. However, heretofore there has not been available a firearm spring compression tool with the features and advantages of the present invention. These include compactness for portability and simplicity of use. Another advantage relates to adaptability to different firearm models.

SUMMARY OF THE INVENTION

In practicing an aspect of the present invention, a firearm spring compression tool is provided for compressing a D-ring in connection with a handguard removal procedure. The tool generally includes a base configured for placement in a magazine receiver, a yoke engaging the D-ring and an actuator configured for flexing the yoke rearwardly on the firearm and thereby compressing the D-ring and releasing the handgrip rear ends.

BRIEF DESCRIPTION OF THE DRAWINGS

The drawings constitute a part of this specification and include exemplary embodiments of the present invention illustrating various objects and features thereof.

FIG. 5.1 is a side, elevational view of the spring compression tool, taken generally within circle 5.1 shown in FIG. 2, with the D-ring and the handguard rear end engaged. A portion of the AR-15, M-4 or M-16 rifle is shown in broken lines.

FIG. 5.2 is a side, elevational view of the spring compression tool, with the D-ring and the handguard rear end disengaged. A portion of the AR-15, M-4 or M-16 rifle is shown in broken lines.

FIG. 6.1 is a front, lower, perspective view of the compression tool in a first position for placing the compression tool over a D-ring.

FIG. 6.2 is a front, lower, perspective view of the compression tool in a second position for releasing a handguard rear end from the compressed D-ring.

FIG. 7.1 is a lower, front, elevational view of the compression tool in a first position for placing the compression tool over the uncompressed D-ring.

FIG. 7.2 is a lower, front elevational view of the compression tool in a second, compression position for releasing the handguard rear end from the compressed D-ring.

DETAILED DESCRIPTION OF THE PREFERRED EMBODIMENTS

I. Introduction and Environment

Figure 1:
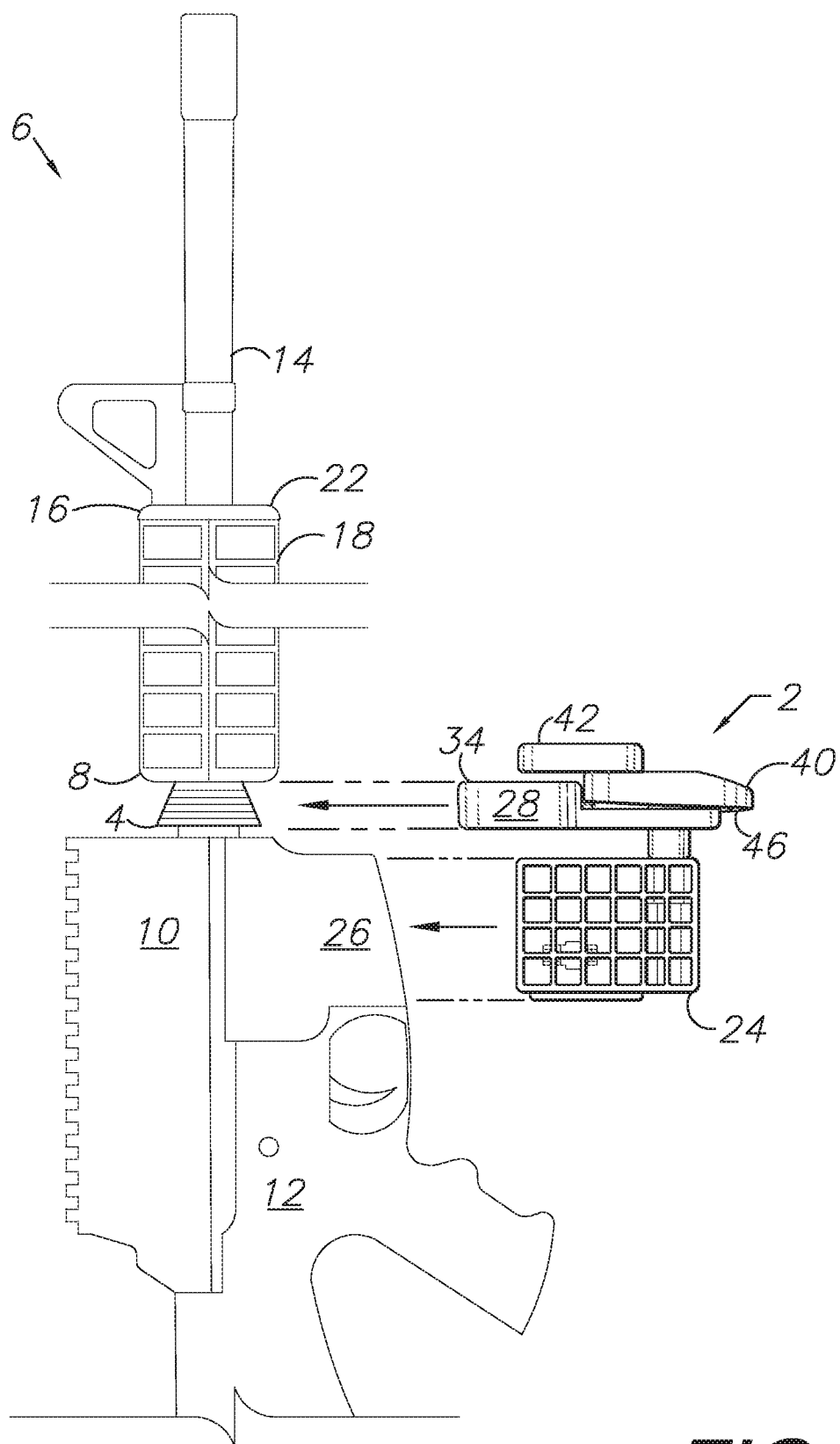
FIG. 1 is a fragmentary, side elevational view of an AR-15, M-4 or M-16 rifle, showing placement of a spring compression tool embodying an aspect of the present invention.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in a use position. The words, "inwardly" and "outwardly" refer to directions toward and away from, respectively, the geometric center of the aspect being described and designated parts thereof. Said terminology will include the words specifically mentioned, derivatives thereof and words of similar meaning.

II. Firearm Spring Compression Tool 2

Referring to the drawings more detail, the reference numeral 2 generally designates a spring compression tool embodying an aspect of the present invention. Without limitation on the generality of useful applications of the present invention, the tool 2 is shown compressing a delta ring ("D-ring") 4 on a firearm 6 for releasing a handguard 8. The firearm 6 can comprise, without limitation, an M-16, an M-4 carbine, an AR-15, various models thereof, and other firearms. Removing the handguard 8 is a common procedure in connection with servicing the applicable firearms, and provides access to barrel, gas tube and other components.

The firearm 6 includes upper and lower receiver assemblies 10, 12 and a barrel 14 partially enclosed by the handguard 8, which comprises upper and lower halves 16, 18 with rearwardly-projecting, arcuate flanges 20. With the firearm 6 assembled, the D-ring 4 (also referred to as a delta ring and a retaining ring) is pressed forwardly into engagement with the handguard 8 rear end and captures the flanges 20. A front cap 22 captures the front ends of the handguard halves, 16, 18.

Figure 2:
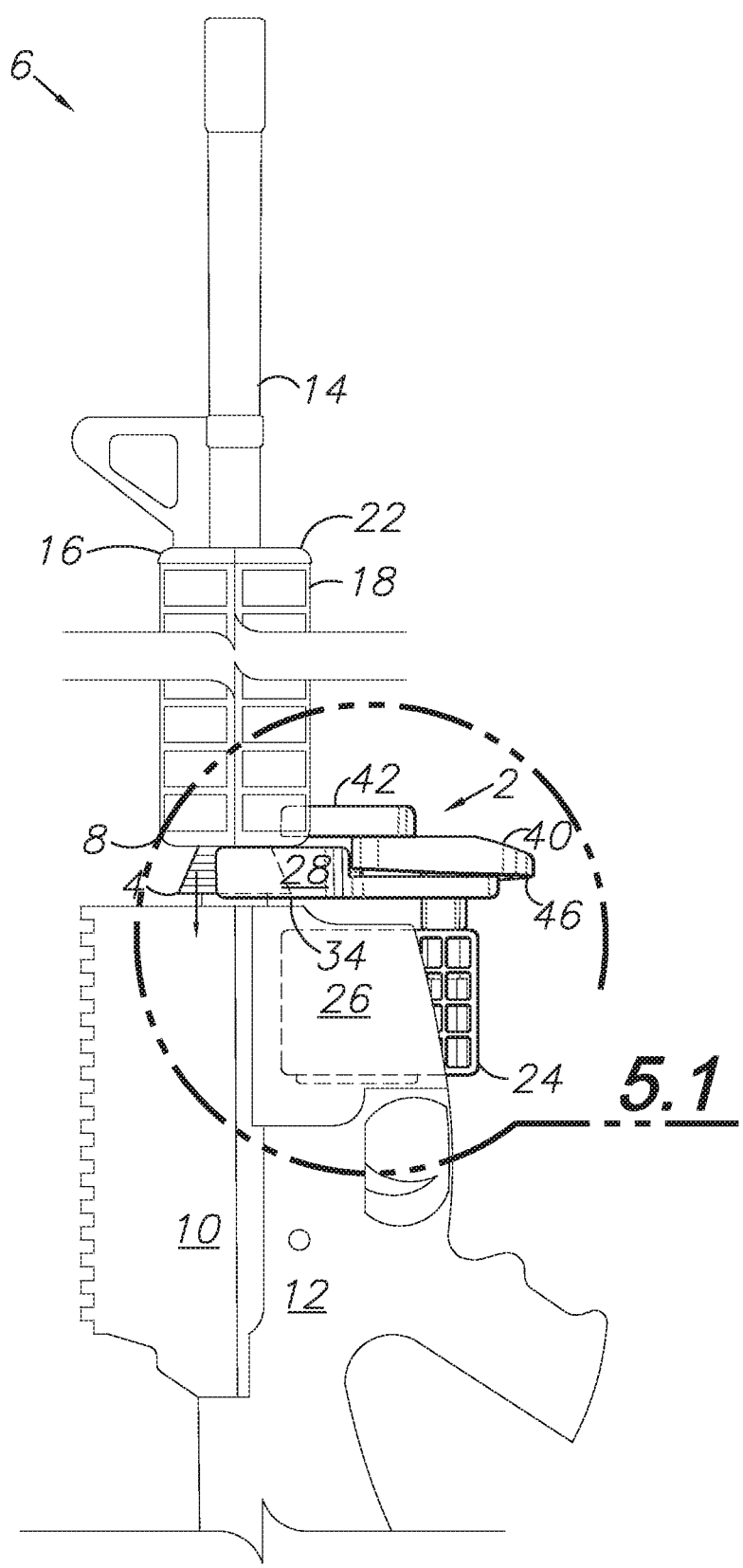
FIG. 2 is a side elevational view thereof, showing the tool in position for compressing a D-ring.
Figure 3:
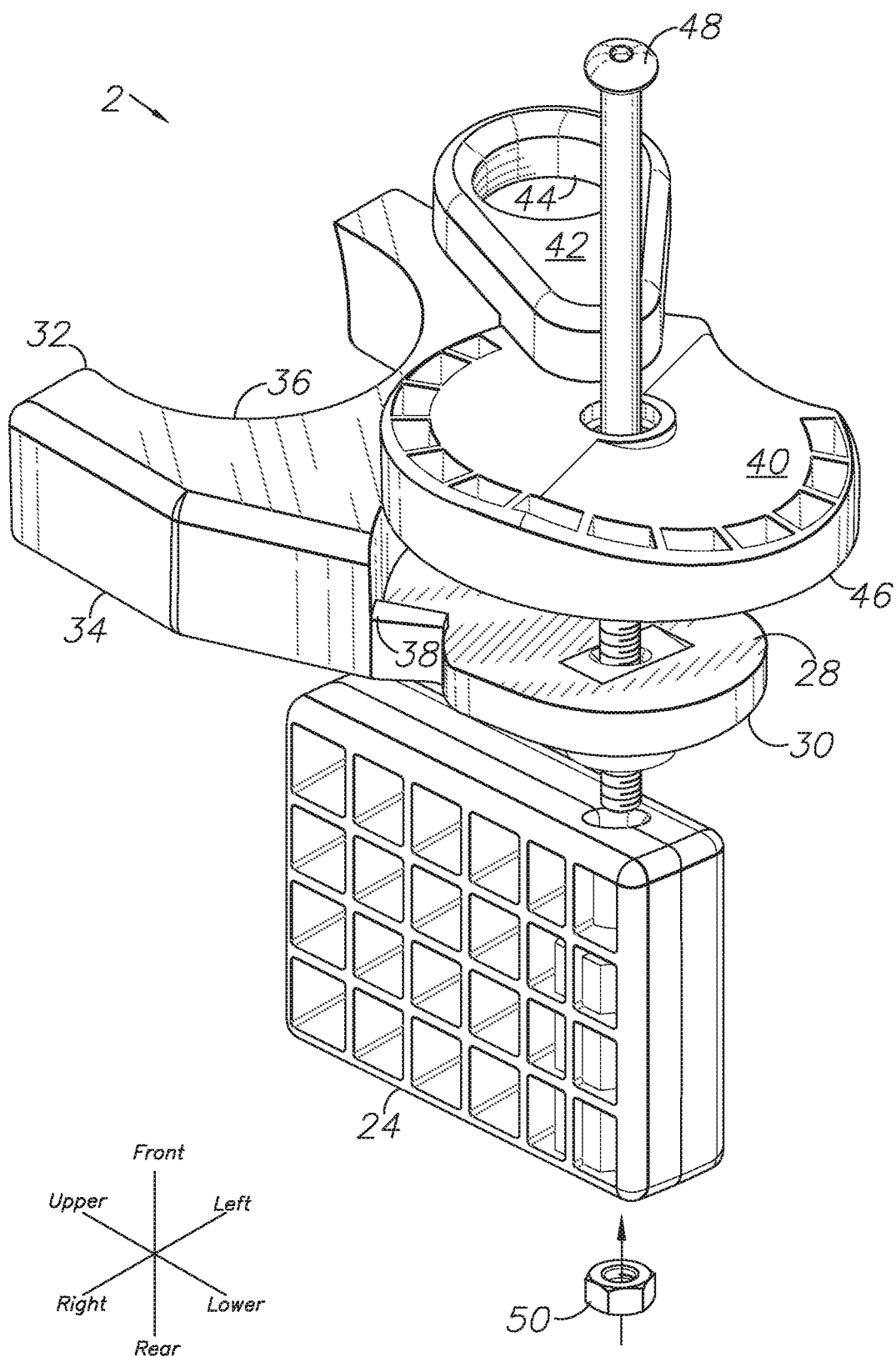
FIG. 3 is a front, lower, right side perspective, exploded view of the spring compression tool.

The compression tool 2 facilitates service procedures by compressing the D-ring in connection with removing and installing the handguard 8. The compression tool 2 includes a base 24, which inserts into the magazine well or opening 26 of the lower receiver assembly 12 and anchors the tool 2 during use. A yoke 28 (FIGS. 3, 4) includes a proximal portion 30 and a distal portion 32, the latter extending generally upwardly with a U-shaped configuration including a pair of yoke arms 34. The yoke distal portion 32 forms an opening 36 between the arms 34. The opening 36 converges forwardly and generally mates with the forwardly-converging D-ring 4 with the tool 2 in place (FIG. 2). The yoke 28 includes a bearing 38 connected to the proximal and distal portions 30, 32 (FIGS. 6.1 and 6.2).

Figure 4:
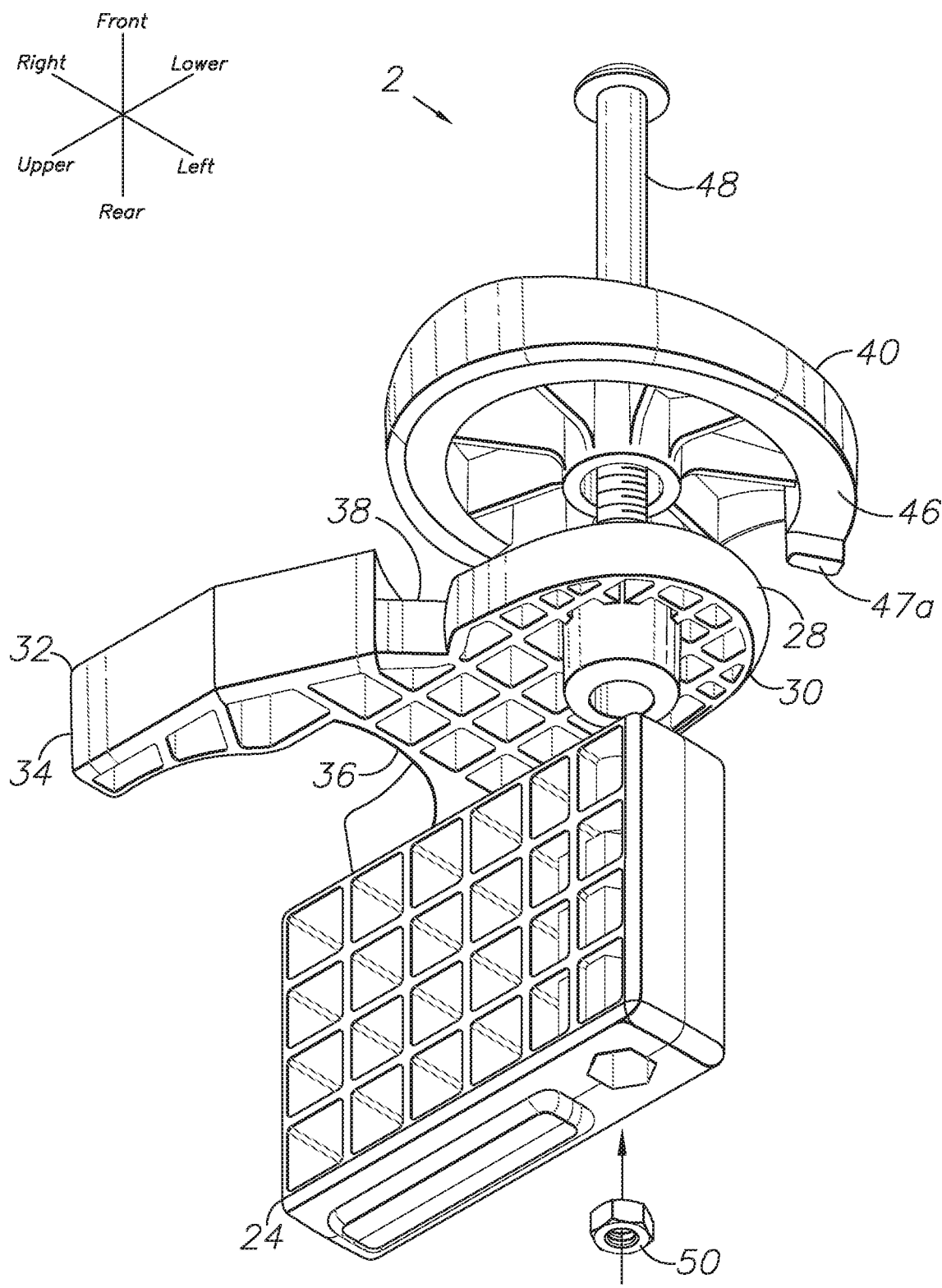
FIG. 4 is a rear, lower, right side perspective, exploded view of the spring compression tool.
Figure 8:
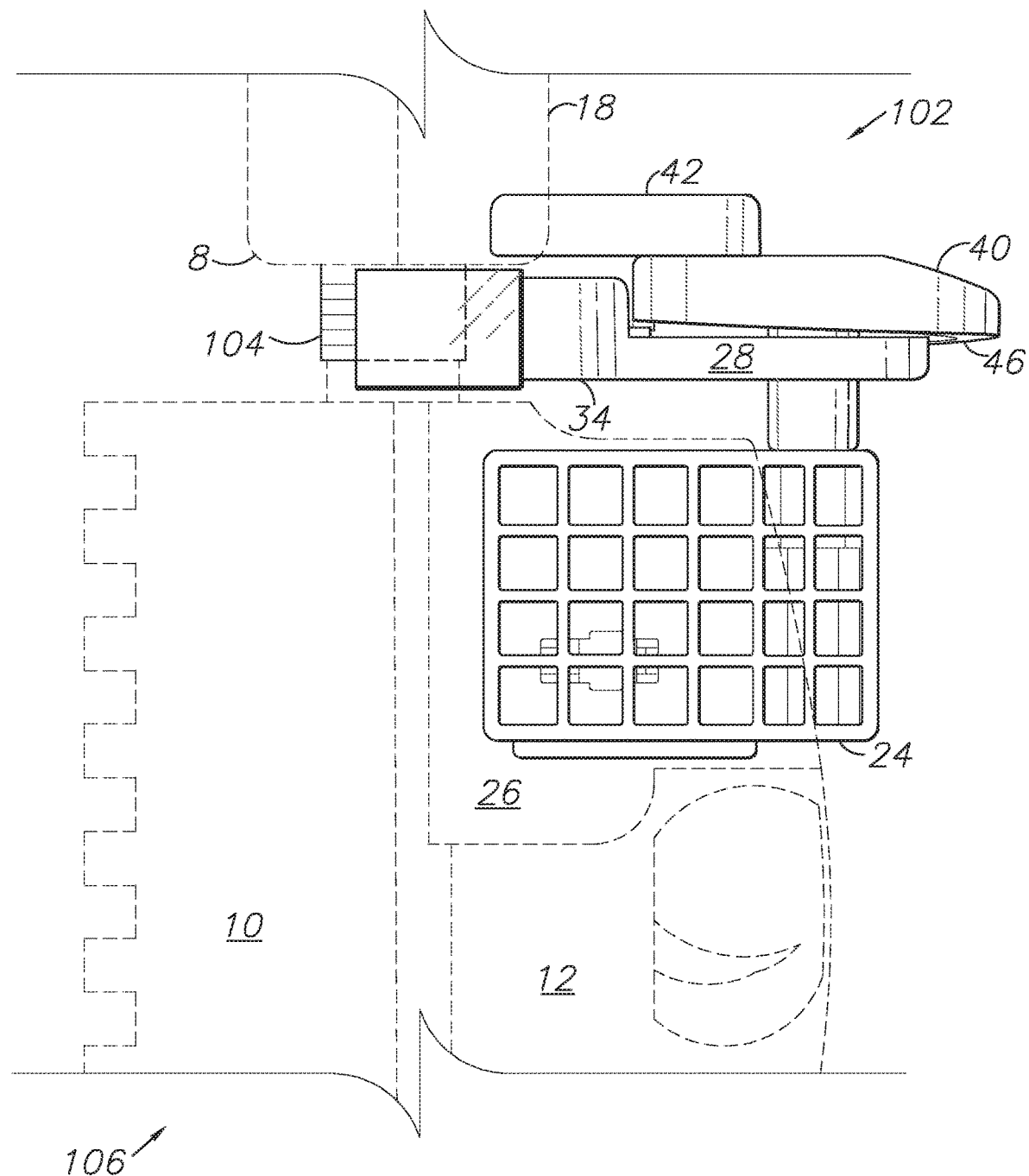
FIG. 8 is a right side elevational view of a spring compression tool comprising a first modified or alternative embodiment of the present invention, shown with an adapter for an alternative D-ring configuration.
Figure 9:
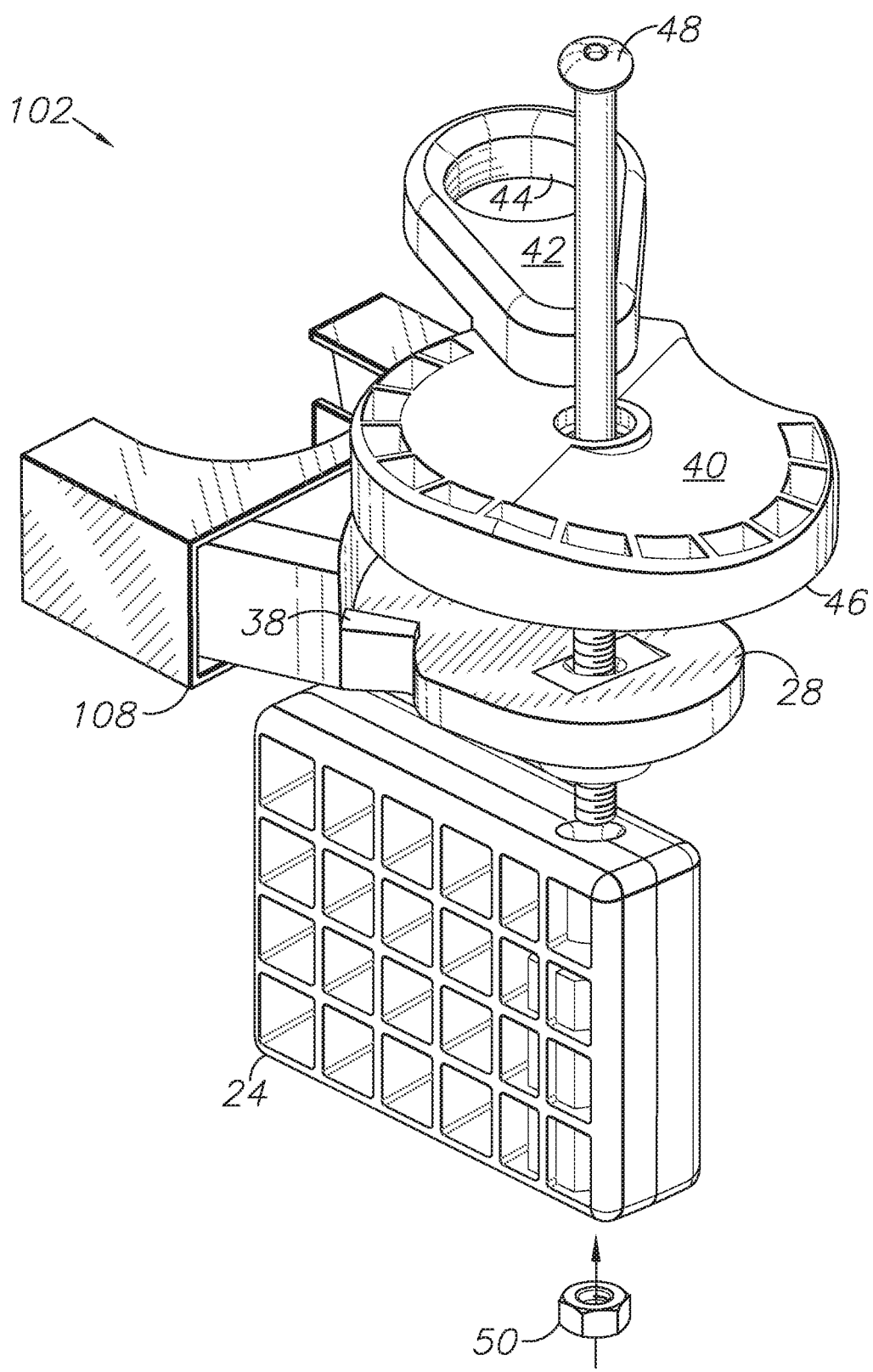
FIG. 9 is an upper, front, perspective view of the modified embodiment spring compression tool.
Figure 10:
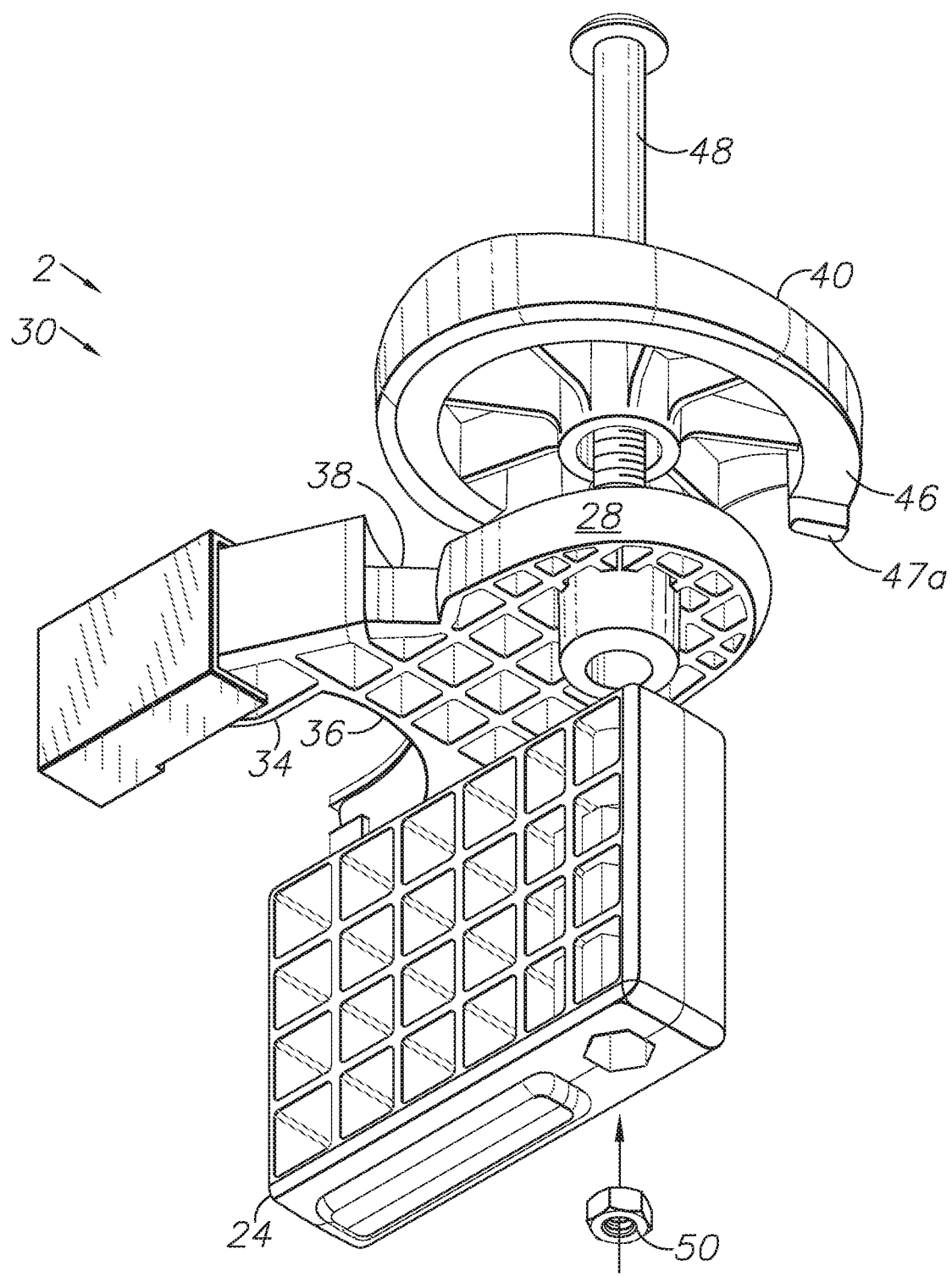
FIG. 10 is a lower, front, perspective view of the modified embodiment spring compression tool.
Figure 11:
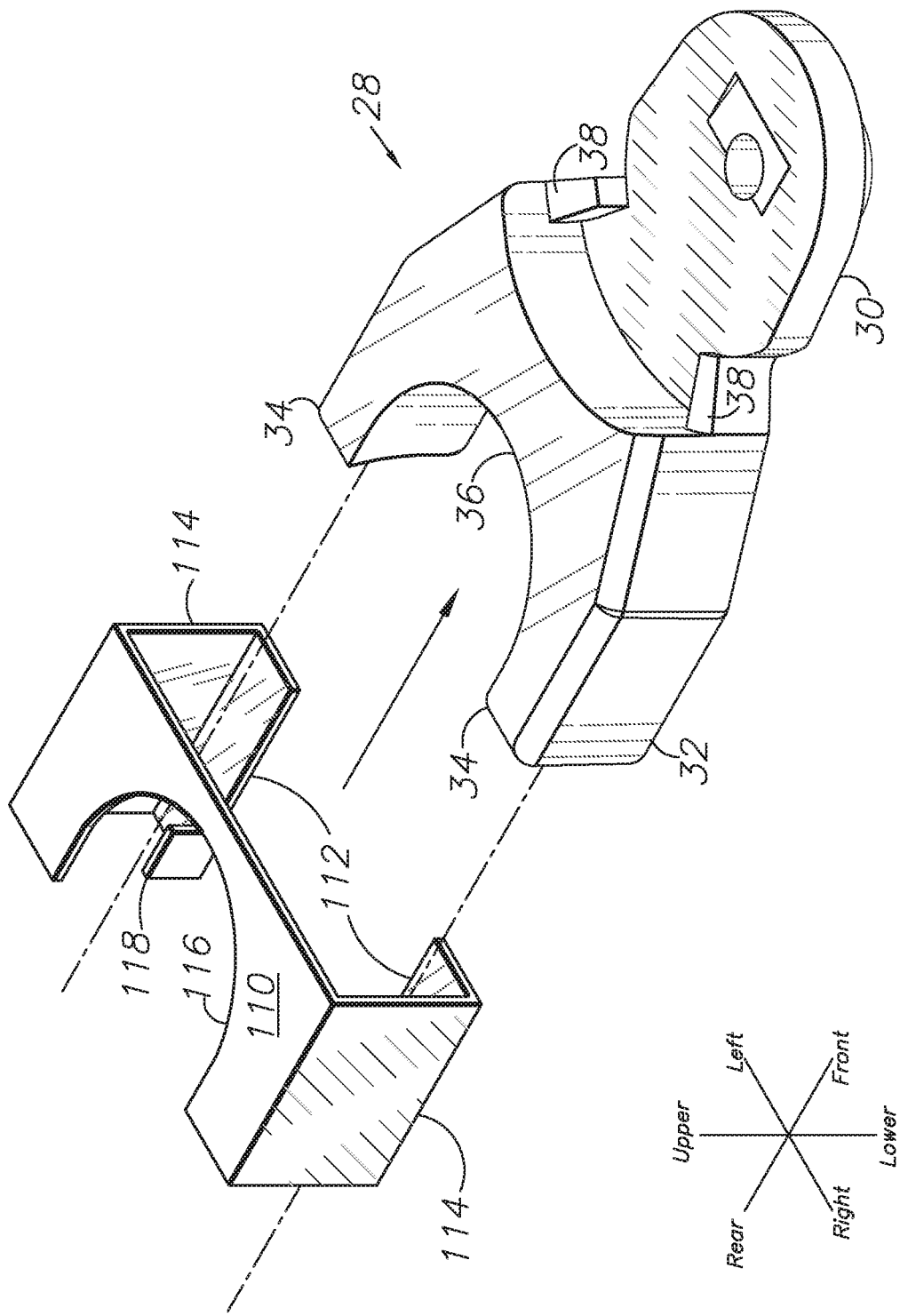
FIG. 11 is an exploded, lower, front, perspective view of a yoke and attachment of the modified embodiment spring compression tool.
Figure 12:
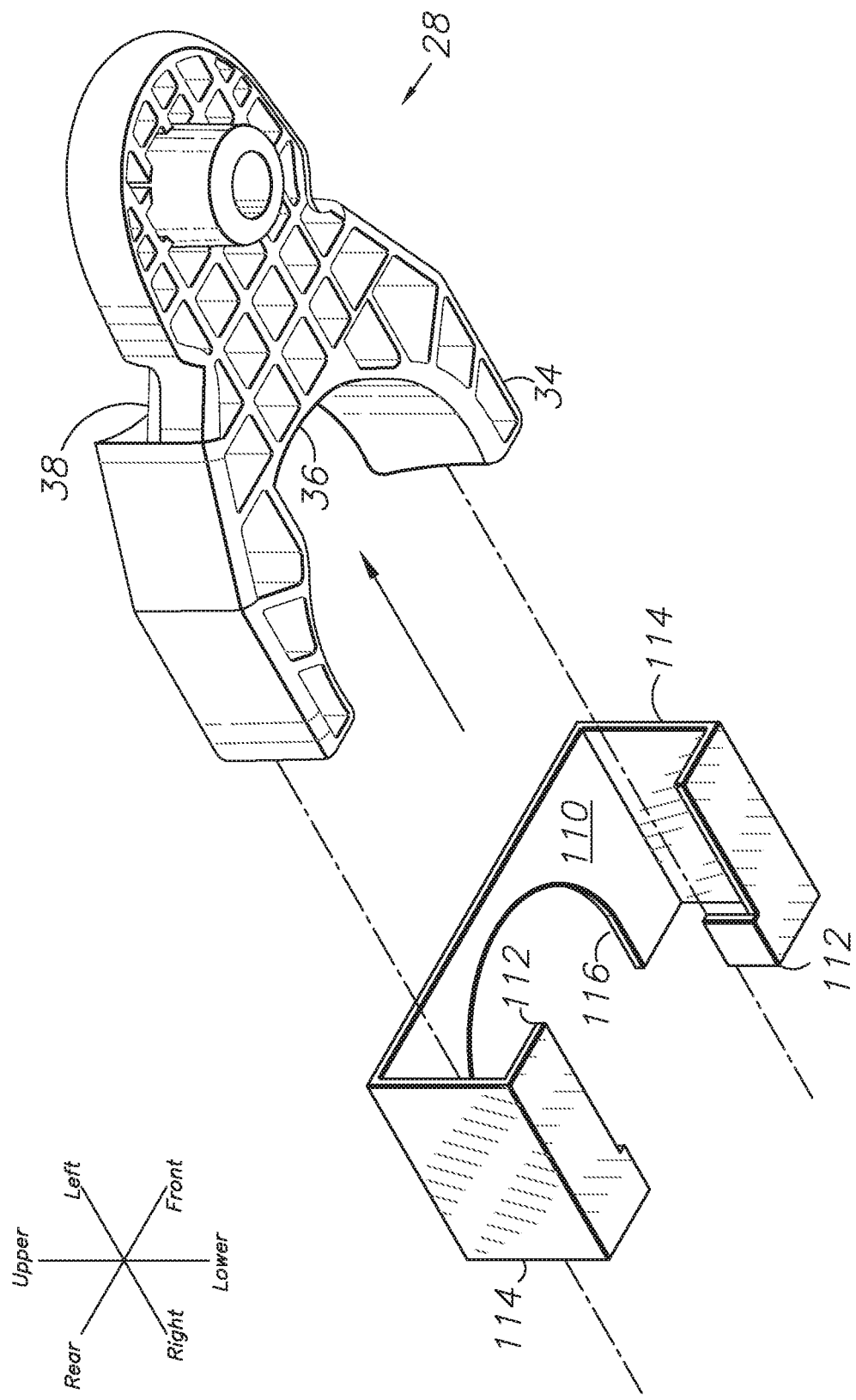
FIG. 12 is an exploded, lower, rear, perspective view of the yoke and attachment of the modified embodiment spring compression tool.
Figure 13:
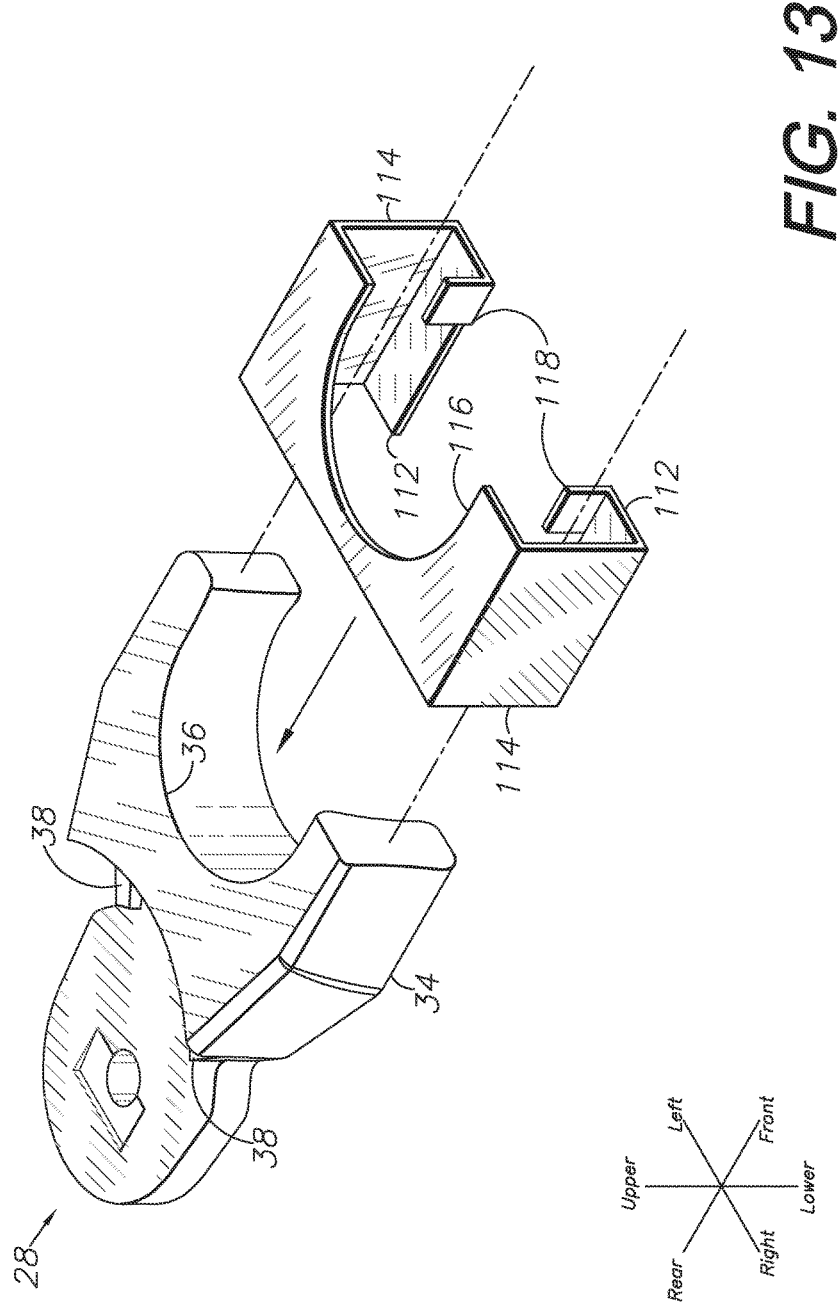
FIG. 13 is an exploded, upper, front, perspective view of the yoke and attachment of the modified embodiment spring compression tool.

The yoke 28 rotatably mounts an actuator 40, which includes a toggle 42 with a circular opening 44. The actuator 40 includes a rearwardly-projecting actuator flange 46. The flange 46 slopes from a minimum rearward-extension at a 1st (uncompressed position) stop 47a to a 2nd (compressed position) stop 47b. The stops 47a, 47b engage the yoke 28 opposite sides, thus restricting the rotation of the actuator 40 between its respective uncompressed/compressed positions. Without limitation and by way of example only, the actuator 40 rotates through about a 315°-330° arc between its extreme positions. The flange 46 engages and slides along bearings 38 on the sides of the yoke proximate portion 30 as the actuator 40 is rotated between its extreme positions with the D-ring 4 uncompressed (handguard 8 retained) and compressed (handguard 8 released) positions. The tool 2 includes an axle bolt 48 extending through aligned receivers in the base 24, the yoke 28 and the actuator 40. The axle bolt 48 is retained in place by a nut 50, which is captured in the rear of the base 24 (FIG. 4).

III. Operation

In operation, the compression tool 2 is installed by inserting the base 24 into the magazine well or opening 26 and the yoke 28 is placed over the D-ring 4. In the placement configuration, the actuator 40 is fully rotated counterclockwise (when viewed from the front) to a starting position as shown in FIG. 6.1, with the toggle 42 on the left side of the firearm 6. The actuator 40 is then rotated clockwise (when viewed from the front), placing the toggle 42 on the right side of the firearm 6. The actuator flange 46 rides across the bearing 38. Due to its tapered or spiral configuration, the flange 46 tilts or flexes the actuator 40, tilting the yoke 28 rearwardly and thereby compresses the D-ring 4 captured therein. The base 24 cooperates with the lower receiver assembly 12 to securely anchor the compression tool 2. With the D-ring 4 compressed rearwardly, the handguard flanges 20 are released from the D-ring 4 (FIG. 5.2), enabling separating the handguard 8 from the front cap 22 and removal of the handguard halves 16, 18. Reassembly can be accomplished by reversing the procedure described above, with the compression tool 2 retaining the D-ring 4 in a rear position until the handguard halves 16, 18 are in place, whereupon the D-ring 4 can be released to capture the flanges 20.

The handguard 8 removal/replacement procedure described above can generally be accomplished with only the tool 2 using a one-handed actuation procedure. The effective simplicity of this procedure accommodates operation and firearm servicing under adverse ambient conditions, e.g., in darkness, dampness and in extreme temperatures.

III. Modified or Alternative Embodiment Firearm Spring Compression Tool 102

FIGS. 8-13 show a firearm spring compression tool 102 comprising a modified or alternative aspect of the present invention. The compression tool 102 is configured for compressing a retaining ring 104 to release a handguard 106. The retaining ring 104 is generally cylindrical, as opposed to the tapered, conical configuration of the D-ring 4 described above. The compression tool 2 is convertible to the spring compression tool 102 and thereby adaptable for compressing the retaining ring 104 by placing an adapter 108 over the yoke arms 34. The adapter 108 includes lower panels 110, 112, side panels 114 and an opening 116, which selectively receives the retaining ring 104. The adapter 108 captures the retaining ring 104 with a flange 118 extending inwardly into the opening 116 and configured for placement over a front end of the retaining ring 104.

With the compression tool 102 installed, the retaining ring 104 compression/decompression and the corresponding handguard 8 removal/placement procedures are similar to those described above in connection with the compression tool 2 and the D-ring 4.

IV. Conclusion

It is to be understood that while certain embodiments and/or aspects of the invention have been shown and described, the invention is not limited thereto and encompasses various other embodiments and aspects. For example, the components of the tools 2 and 102 are scalable and reconfigurable to accommodate various applications.

Having thus described the invention, what is claimed as new and desired to be secured by Letters Patent is:

1. A compression tool for a firearm including a receiver with a magazine well, a barrel extending forwardly from the receiver, a handguard positioned over the barrel and a spring-loaded retaining ring retaining the handguard over the barrel, the retaining ring longitudinally movable between a first, forward, uncompressed, handguard retain position and a second, rearward, compressed, handguard release position, which compression tool comprises:

a base selectively received in said magazine well;

a yoke mounted on said base and including a pair of arms extending outwardly from the base, said yoke movable between a first tool-placement position for placement on the uncompressed retaining ring and a second, handguard-release position compressing the retaining ring; and an actuator mounted on the yoke and rotatable between a handguard retain position and a handguard release position with the retaining ring and the yoke in their first and second positions respectively.

2. The compression tool according to claim 1, which includes:
a toggle mounted on the actuator and configured for rotating the actuator.

3. The compression tool according to claim 1, which includes:
at least one of said yoke and said actuator having a bearing;
the other of said yoke and said actuator having a flange;
said bearing slidably engaging said flange as said yoke moves between its first and second positions;
said flange having a sloping, tapered configuration with a first end corresponding to said yoke first position and a second end corresponding to said yoke second position; and
said bearing and said flange engagement biasing said yoke from its first position to its second position as said actuator rotates from its first position to its second position respectively.

4. The compression tool according to claim 3 wherein:
said yoke includes said bearing and said actuator includes said flange; and
said actuator includes first and second stops configured for engaging said bearing with said yoke in its first and second positions respectively.

5. The compression tool according to claim 1, which includes:
said retaining ring having a tapered, forwardly-converging configuration;
said yoke forming a yoke opening between said yoke arms; and
said yoke opening having a tapered, forwardly-converging configuration corresponding to said retaining ring configuration.

6. The compression tool according to claim 1, which includes:
said retaining ring having a generally cylindrical configuration; and
an attachment configured for placement over said yoke arms and coupling with said retaining ring for moving same between said handguard retain and release positions respectively.

7. The compression tool according to claim 1, which includes:
an axle bolt extending through said base, said yoke and said actuator.

8. The compression tool according to claim 7, which includes:
said actuator being pivotally mounted on said yoke;
said axle bolt defining a rotational axis of said actuator relative to said yoke; and
said rotational axis extending generally longitudinally relative to said firearm.

9. The compression tool according to claim 8 wherein:
said axle bolt is generally perpendicular to said yoke with said yoke in its first position; and
said yoke tilts rearwardly relative to said axle bolt in its second position.

10. The compression tool according to claim 9 wherein:
said actuator includes a downwardly-extending boss rotationally engaging said yoke; and
said axle bolt extends through said boss.

11. A compression tool for a firearm including a receiver with a magazine well, a barrel extending forwardly from the receiver, a handguard positioned over the barrel and a spring-loaded retaining ring retaining the handguard over the barrel, the retaining ring longitudinally movable between a first forward, uncompressed, handguard retain position and a second rearward, compressed, handguard release position, which compression tool comprises:
a base selectively received in said magazine well;
a yoke mounted on said base and including a pair of arms extending outwardly from the base, said yoke movable between a first, handguard retain position for placement on the uncompressed retaining ring and a second, handguard release position compressing the retaining ring;
an actuator mounted on the yoke and rotatable between said first, handguard retain position and said second, handguard release position with the yoke in its first and second positions respectively;
said actuator having a bearing;
said yoke having a flange with a sloping, tapered configuration;
said bearing slidably engaging said flange as said yoke moves between its first and second positions; and
said bearing and said flange engagement biasing said yoke from its first position to its second position as said actuator rotates from its handguard retain position to its handguard release position.

12. The compression tool according to claim 11, which includes:
a toggle mounted on the actuator and configured for rotating the actuator between its handguard retain position and its handguard release position.

13. The compression tool according to claim 11 wherein:
said actuator includes first and second stops configured for engaging said bearing with said yoke in its first and second positions respectively.

14. The compression tool according to claim 11, which includes:
said retaining ring having a tapered, forwardly-converging configuration;
said yoke forming a yoke opening between said yoke arms; and
said yoke opening having a tapered, forwardly-converging configuration corresponding to said retaining ring configuration.

15. The compression tool according to claim 11, which includes:
said retaining ring having a generally cylindrical configuration; and
an attachment configured for placement over said yoke arms and coupling with said retaining ring for moving same between said handguard retain and release positions respectively.

16. The compression tool according to claim 11, which includes:
an axle bolt extending through said base, said yoke and said actuator.

17. The compression tool according to claim 16, which includes:
said actuator being pivotally mounted on said yoke;
said axle bolt defining a rotational axis of said actuator relative to said yoke; and
said rotational axis extending generally longitudinally relative to said firearm.

18. The compression tool according to claim 17 wherein:
said axle bolt is generally perpendicular to said yoke with said yoke in its first position; and
said yoke tilts rearwardly relative to said axle bolt in said yoke second position.

19. The compression tool according to claim 18 wherein:
said actuator includes a forwardly-extending boss rotationally engaging said yoke; and
said axle bolt extends through said boss.

20. A compression tool for a firearm including a receiver with a magazine well, a barrel extending forwardly from the receiver, a handguard positioned over the barrel and a spring-loaded retaining ring retaining the handguard over the barrel, the retaining ring longitudinally movable between a forward, uncompressed, handguard retain position and a rearward, compressed, handguard release position, which compression tool comprises:

a base selectively received in said magazine well;

a yoke mounted on said base and including a pair of arms extending upwardly from the base, said yoke movable between a first tool-placement position for placement on the uncompressed retaining ring and a second, handguard-release position compressing the retaining ring;

an actuator mounted on the yoke and rotatable between a yoke placement position and a handguard release position with the yoke in its first and second positions respectively;

said yoke having a bearing;

said actuator having a flange;

said bearing slidably engaging said flange as said yoke moves between its first and second positions;

said flange having a sloping, tapered configuration with a first end corresponding to said yoke first position and a second end corresponding to said yoke second position;

said bearing and said flange engagement biasing said yoke from its first position to its second position as said actuator rotates from its yoke placement position to its handguard release position;

a toggle mounted on the actuator and configured for rotating the actuator between its first and second positions;

said actuator including first and second stops configured for engaging said bearing with said yoke in its first and second positions respectively;

an axle bolt extending through said base, said yoke and said actuator;

said axle bolt defining a rotational axis of said actuator relative to said yoke;

said rotational axis extending generally longitudinally relative to said firearm;

said axle bolt being generally perpendicular to said yoke with said yoke in its first position;

said yoke tilting rearwardly relative to said axle bolt in said yoke second position;

said actuator including a rearwardly-extending boss rotationally engaging said yoke; and said axle bolt extending through said boss.

* * * * *